(12) United States Patent
Kominami

(10) Patent No.: US 10,752,081 B2
(45) Date of Patent: Aug. 25, 2020

(54) VEHICULAR AIR CONDITIONING DEVICE

(71) Applicant: MITSUBISHI HEAVY INDUSTRIES THERMAL SYSTEMS, LTD., Tokyo (JP)

(72) Inventor: Satoshi Kominami, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 27 days.

(21) Appl. No.: 15/774,901

(22) PCT Filed: Nov. 2, 2016

(86) PCT No.: PCT/JP2016/082604
§ 371 (c)(1),
(2) Date: May 9, 2018

(87) PCT Pub. No.: WO2017/082139
PCT Pub. Date: May 18, 2017

(65) Prior Publication Data
US 2018/0354340 A1 Dec. 13, 2018

(30) Foreign Application Priority Data
Nov. 12, 2015 (JP) .................................. 2015-222024

(51) Int. Cl.
*B60H 1/00* (2006.01)
*B60H 1/12* (2006.01)

(52) U.S. Cl.
CPC ........... *B60H 1/00678* (2013.01); *B60H 1/00* (2013.01); *B60H 1/00064* (2013.01); *B60H 1/12* (2013.01); *B60H 2001/00714* (2013.01)

(58) Field of Classification Search
CPC .............. B60H 1/00678; B60H 1/3227; B60H 1/0064; B60H 1/12; B60H 2001/00714
See application file for complete search history.

(56) References Cited

U.S. PATENT DOCUMENTS

2004/0069444 A1* 4/2004 Clifford ............. B60H 1/00678 165/42
2005/0233687 A1* 10/2005 Wachter ............. B60H 1/00678 454/152

(Continued)

FOREIGN PATENT DOCUMENTS

JP   11180129 A  * 7/1999 ......... B60H 1/00678
JP   2004-42686 A   2/2004
(Continued)

OTHER PUBLICATIONS

International Search Report (Form PCT/ISA/210) for International Application No. PCT/JP2016/082604, dated Jan. 24, 2017, with English translation.

(Continued)

*Primary Examiner* — Devon Russell
(74) *Attorney, Agent, or Firm* — Birch, Stewart, Kolasch & Birch, LLP

(57) ABSTRACT

A vehicular air conditioning device includes a damper and a unit case in which a shaft receiving hole is formed for supporting the damper. The damper includes a rotating shaft portion extending in an axial direction, and a plate-like first damper body extending from the rotating shaft portion. The rotating shaft portion includes a flange portion provided at only a partial region in the circumferential direction of the axis. The inner wall surface of the unit case includes an elongated protrusion, with which a first damper plate surface of the first damper body is contactable from another side in the circumferential direction, and a contact portion with which a second damper plate surface of the first damper body is contactable from one side in the circumferential direction. A radial space between a radially inward end part of the elongated protrusion and a shaft receiving hole is less than a radial size of the flange portion.

5 Claims, 4 Drawing Sheets

(56) References Cited

U.S. PATENT DOCUMENTS

2009/0093207 A1* 4/2009 Han .................. B60H 1/00678
454/155
2010/0224253 A1* 9/2010 Azar ................. B60H 1/00678
137/1

FOREIGN PATENT DOCUMENTS

JP         2004151709 A  *  5/2004
JP         2011-11584 A      1/2011

OTHER PUBLICATIONS

Written Opinion of the International Searching Authority (Form PCT/ISA/237) for International Application No. PCT/JP2016/082604, dated Jan. 24, 2017, with English translation.

* cited by examiner

VEHICULAR AIR CONDITIONING DEVICE

TECHNICAL FIELD

The present invention relates to a vehicular air conditioning device.

This application claims priority based on JP 2015-222024 filed in Japan on Nov. 12, 2015, of which the contents are incorporated herein by reference.

BACKGROUND ART

A vehicular air conditioning device used in an automobile and the like includes a heater core which is a heat exchanger for heating, an evaporator which is a heat exchanger for cooling, an air mixing space for mixing warm air that has passed through the heater core and cool air that has passed through the evaporator, and an air mixing damper for changing a mixing ratio between the warm air and cool air in the air mixing space. In such a device, a mixing ratio between the cool air and the warm air is changed by adjusting a pivot amount of the air mixing damper, and thus air with a desired temperature is obtainable.

For the aforementioned device, from a view point of supplying air with uniform temperature distribution to the respective seats inside the vehicle, it is important for the air mixing damper to uniformly suppress air leakage between a heater core side and an evaporator side. Specifically, when the respective parts of the air mixing damper are different in sealing performance, the mixing ratio between the warm air and the cool air may be changed locally. This may cause an imbalance of temperature distribution in the air discharged into the inside of the vehicle.

A technology for suppressing such air leakage is known, for example, from Patent Document 1 listed below. In the vehicular air conditioning device disclosed in Patent Document 1, the rim of a plate-like air mixing door (an air mixing damper) is made in contact with a sealing wall that is integrally formed in an air conditioning case. In such a vehicular air conditioning device, the sealing performance between the heater core side and the evaporator side by the air mixing door is enhanced.

PRIOR ART DOCUMENTS

Patent Document

Patent Document 1: JP 2004-42686 A

SUMMARY OF THE INVENTION

Problem to be Solved by the Invention

The device disclosed in Patent Document 1 includes a gap formed near the rotation axis of the air mixing door so as not to hinder the movable range of the air mixing door. Hence, while the sealing performance at the rim of the air mixing door is enhanced, air passes through the gap and may leak between the heater core side and the evaporator side. At a region at which such air leakage occurs, the cool air and the warm air are mixed unexpectedly. Thus, when the air is supplied into the interior space of the vehicle, air temperature distribution in the interior space may be ununiform. This may reduce apparent efficiency of an air conditioner.

In light of the foregoing, an object of the present invention is to provide a vehicular air conditioning device capable of providing sufficient air conditioning efficiency.

Means for Solving the Problem

A vehicular air conditioning device according to a first aspect of the present invention includes: a damper including a rotating shaft portion and a first damper body, the rotating shaft extending in an axial direction with an insertion shaft arranged at an end in the axial direction, the first damper body extending from the rotating shaft portion in a radial direction of the axis and having a plate-like shape; and a unit case including a side wall portion with a shaft receiving hole into which the insertion shaft is rotatably inserted, and configured to accommodate the damper, and the rotating shaft portion includes a flange portion provided at only a part of a circumferential region of the axis, the flange portion extending radially outward from a base end of the insertion shaft, the first damper body includes a first damper plate surface facing one side in a circumferential direction, a second damper plate surface facing another side in the circumferential direction, and a first damper end face extending radially outward from an end part of the flange portion at the one side in the circumferential direction and being flush with the flange portion, the side wall portion includes an inner wall surface, an elongated protrusion, and a contact portion, the inner wall surface being contactable with the flange portion and the first damper end face from the axial direction, the elongated protrusion protruding in the axial direction from the inner wall surface and extending in the radial direction of the axis and being contactable with the first damper plate surface of the first damper body from the another side in the circumferential direction, the contact portion being provided to be apart from and closer to the another side in the circumferential direction than to the elongated protrusion and extending in the radial direction of the axis, and being contactable with the second damper plate surface of the first damper body from the one side in the circumferential direction, and a radial space between a radially inward end part of the elongated protrusion and the shaft receiving hole is less than a radial size of the flange portion.

According to such a configuration, the radial space between the radially inward end part of the elongated protrusion and the hole receiving hole is less than the radial size of the flange portion. This reduces the possibility of fluid leakage from a gap between the radially inward end part of the elongated protrusion and the rotating shaft portion. On the other hand, when the radial space between the radially inward end part of the elongated protrusion and the shaft receiving hole is greater than the radial size of the flange portion, the above-described gap increases with axial misalignment of the rotating shaft portion. As a result, there is a possibility of fluid leakage through the gap. However, according to the above-described configuration, such a possibility is reduced.

In the vehicular air conditioning device according to a second aspect of the present invention, in the above-described vehicular air conditioning device of the first aspect, the damper further includes a second damper body being spaced from the first damper body in the circumferential direction, and having a plate-like shape extending from the rotating shaft portion in the radial direction of the axis, and the second damper body includes a second damper end face extending radially outward from an end part at the another side in the circumferential direction of the flange portion, and being flush with the flange portion and the first damper end face.

According to such a configuration, the provision of the second damper body ensures a larger dimension of the damper. Accordingly, when the flow of the fluid flowing through the unit case is changed or guided, even in a case where the cross-sectional area of the flow path of the fluid is large, the configuration is sufficiently applicable.

In the vehicular air conditioning device according to a third aspect of the present invention, in the above-described vehicular air conditioning device of the first or second aspect, the elongated protrusion includes: a first portion constituting a radially outward part of the elongated protrusion; and a second portion constituting a radially inward part of the elongated protrusion, the second portion extending on either of the one side or the another side in the circumferential direction as the second portion approaches radially inward from the first portion.

According to such a configuration, the second portion of the elongated protrusion makes the radial space between the radially inward end part of the elongated protrusion and the hole receiving hole smaller than the radial size of the flange portion. This reduces the possibility of fluid leakage from the gap between the radially inward end part of the elongated protrusion and the rotating shaft portion.

In the vehicular air conditioning device according to a fourth aspect of the present invention, in the above-described vehicular air conditioning device of any one of the first to third aspects, an angular range of a region, in which the flange portion is not provided, around the axis at the rotating shaft portion corresponds to a pivot angle range of the rotating shaft portion to be defined by the elongated protrusion and the contact portion, the elongated protrusion being configured to contact the first damper body.

According to such a configuration, the angular range of the region at which the flange portion is not formed corresponds to the pivot angle range of the rotating shaft portion. This prevents the flange portion and the elongated protrusion from interfering with the contact portion when the rotating shaft portion rotates. Specifically, according to the configuration, the fluid leakage around the rotating shaft portion is suppressed and a sufficient pivot angle range of the rotating shaft portion is ensured.

The vehicular air conditioning device according to a fifth aspect of the present invention, in the above-described vehicular air conditioning device of any one of the first to fourth aspects, further includes: an evaporator configured to cool air; and a heater core configured to heat air, and a cooling space, a heating space, and an air mixing space are formed in the unit case, the cooling space being configured to accommodate the evaporator, a heating space being connected to the cooling space and configured to accommodate the heater core, the mixing space being connected to the cooling space and the heating space, and the damper serves as an air mixing damper provided among the cooling space, the heating space, and the mixing space, in the unit case, the air mixing damper being configured to rotate between a maximum cooling position and a maximum heating position to adjust a ratio of air to be introduced into the air mixing space between the air from the cooling space and the air from the heating space.

According to this configuration, it is possible to reduce the possibility of fluid leakage around the damper as the air mixing damper, in particular, around the rotating shaft portion. As a result, it is possible to reduce the possibility of leakage of the fluid between the heating space and the cooling space when the damper is at the maximum heating position or the maximum cooling position. In this way, it is possible to further enhance the efficiency as the vehicular air conditioning device.

Effect of Invention

According to the present invention, it is possible to provide the sufficient air conditioning efficiency.

DESCRIPTION OF THE PREFERRED EMBODIMENTS

First Embodiment

Figure 1:
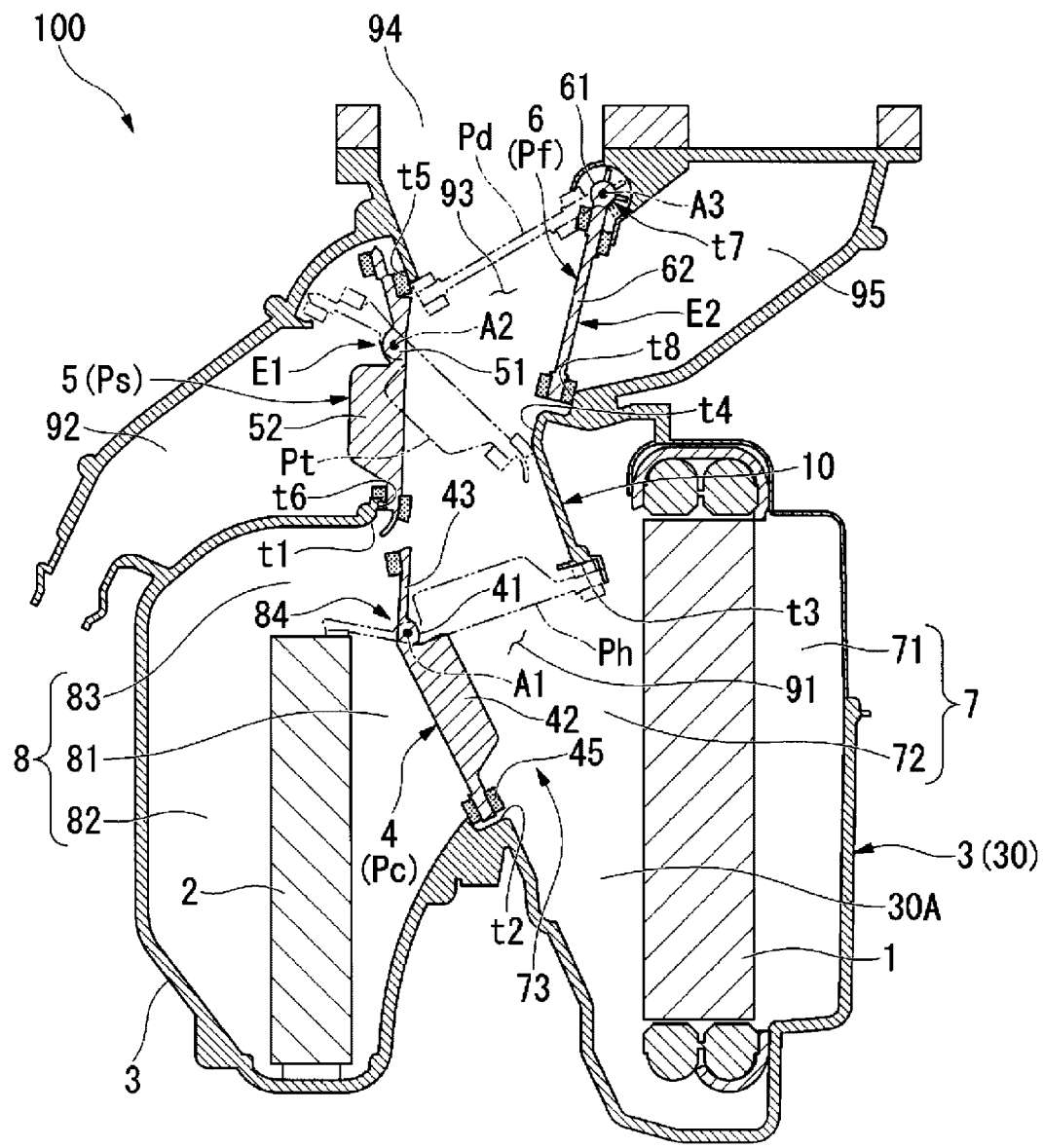
FIG. 1 is a cross-sectional view of a vehicular air conditioning device in an embodiment of the present invention, taken along a plane perpendicular to a first axis.

Embodiments of the present invention will be described below with reference to the drawings. As illustrated in FIG. 1, a vehicular air conditioning device 100 according to the present embodiment includes an evaporator 1, a heater core 2, a unit case 3 in which the evaporator 1 and the heater core 2 are accommodated, and an air mixing damper 4, a foot switching damper 5, and a face/defroster switching damper 6. The dampers 4, 5, and 6 adjust air flow inside the unit case 3.

FIG. 1 is a cross-sectional view of the vehicular air conditioning device 100 as viewed from the width direction transverse to the traveling direction of a vehicle on which the vehicular air conditioning device 100 is mounted. In the following description, the "as viewed in section" refers to a cross section as viewed in the width direction.

As the evaporator 1, a heat exchanger for cooling is used which employs a vapor compression refrigerating cycle, by way of example. A low-pressure refrigerant flowing through the evaporator 1 evaporates by absorbing heat from the air flowing around the evaporator 1, and thus this air is cooled. In the present embodiment, the evaporator 1 is formed in thick plate shape.

As the heater core 2, a hot-water heat exchanger for heating is used which heats air by using the hot water (engine-cooling fluid) from a vehicle engine, not illustrated, or the like. The heat quantity of the hot water flowing through the heater core 2 is imparted to the air flowing around the heater core 2, and thus this air is heated. In the present embodiment, the heater core 2 is also formed in thick plate shape, which is similar to the evaporator 1.

The unit case 3 accommodates the evaporator 1 and the heater core 2 and defines an air flow channel in the inside. More specifically, a cooling space 7, a heating space 8, an air mixing space 91, a foot outlet flow channel 92, an intermediary space 93, a face outlet flow channel 94, and a defroster outlet flow channel 95, are formed within the unit case 3.

The evaporator 1 is accommodated in the cooling space 7. The evaporator 1 partitions the inside of the cooling space 7 into two spaces. The cooling space 7 is partitioned by the evaporator 1 into an introduction space 71 and a cool air supply space 72. A space formed on one side of the evaporator 1 is the introduction space 71, through which the air introduced by a fan, not illustrated, or the like flows. A space formed on the opposite side of the introduction space 71 with respect to the evaporator 1 is the cool air supply space 72, through which the air cooled by the evaporator 1 flows. In this way, the air in the introducing space 71 is applied to and is brought into contact with the evaporator 1 by the blowing of the fan and is then cooled. Such cooled air flows into the cool air supply space 72. The outlet of the cool air supply space 72 is a cool air outlet 73.

The heater core 2 is accommodated in the heating space 8. The heating space 8 and the cooling space 7 are in communication with each other via a part of the air mixing space 91, as will be described later. The heating space 8 is disposed at a position facing the cool air supply space 72 of the aforementioned cooling space 7. The heater core 2 partitions the inside of the heating space 8 into three spaces. The heating space 8 is partitioned by the heater core 2 into a second introduction space 81, a warm air supply space 82, and a return space 83. A space on the cooling space 7 side with respect to the heater core 2 is the second introduction space 81, to which the air supplied from the above-described cool air supply space 72 is guided. A space on the side opposite the second introduction space 81 with respect to the heater core 2 is the warm air supply space 82, through which the air heated by the heater core 2 flows. In other words, the air in the second introducing space 81 is heated by contacting the heater core 2 and flows into the warm air supply space 82.

Within the heating space 8, a space is formed between the upper end part of the heater core 2 and the inner wall of the unit case 3. This space serves as the above-described return space 83. The return space 83 is a space for returning the air, which has sequentially passed through the second introduction space 81 and the warm air supply space 82, to the air mixing space 91, as will be described later. The outlet of the return space 83 is a warm air outlet 84.

The air mixing space 91 is located at a position between the cooling space 7 and the heating space 8. The cooling space 7 and the heating space 8 are connected with each other via the air mixing space 91. In the air mixing space 91, the air cooled in the cooling space 7 (cool air) and the air heated in the heating space 8 (warm air) are mixed. The air mixing space 91 is in communication with the cool air supply space 72 in the cooling space 7 and the warm air supply space 82 in the heating space 8. The air mixing space 91 is a space which provides a flow path extending generally upward. A guiding partition wall portion 10 for guiding the air flowing through the air mixing space 91 upward is provided on the cooling space 7 side in the air mixing space 91.

Figure 2:
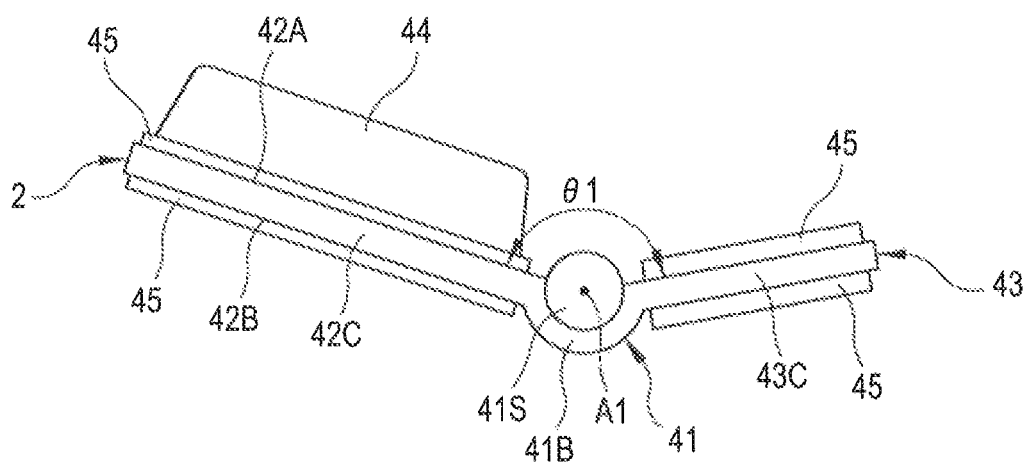
FIG. 2 is a diagram of the air mixing damper in an embodiment of the present invention, as viewed from a direction along the first axis.
Figure 3:
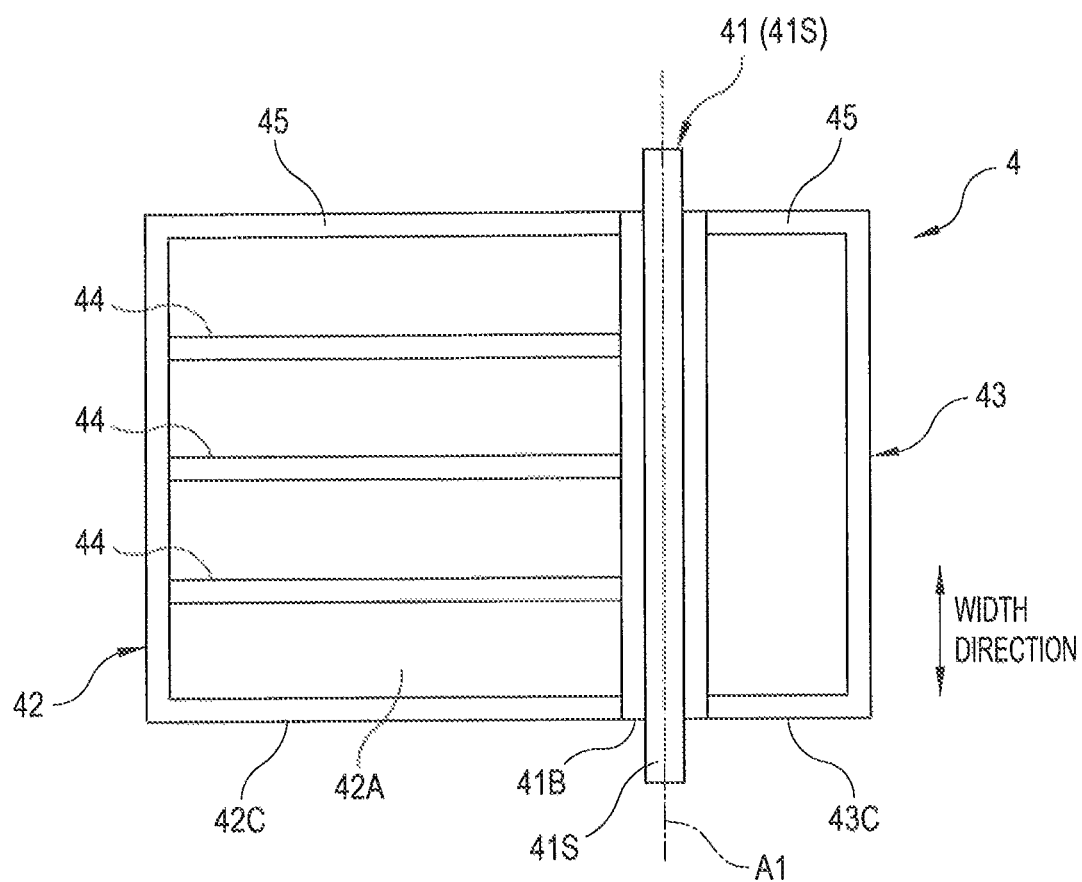
FIG. 3 is a diagram of the air mixing damper in an embodiment of the present invention, as viewed from a direction transverse to the first axis.

An air mixing damper 4 (damper) adjusts a ratio of mixing the air introduced from the cooling space 7 and the air introduced from the heating space 8. The air mixing damper 4 is arranged across the air mixing space 91 and the heating space 8. As illustrated in FIGS. 1 to 3, the air mixing damper 4 includes a plate-like member that is pivotably supported on the warm air outlet 84 in the heating space 8. The air mixing damper 4 includes a first support portion 41 (rotating shaft portion), which turns about a first axis A1 (axis) extending in the vehicle width direction, an air mixing damper body 42 provided at the first support portion 41, and a reheat preventing damper 43. The air mixing damper body 42 (first damper body) and the reheat preventing damper 43 (second damper body) are disposed across the first support portion 41. The first support portion 41 extends in the vehicle width direction at a position of the warm air outlet 84. As illustrated in FIGS. 2 and 3, the air mixing damper 42 extends through the first support portion 41, and also extends from the first support portion 41 in a first direction transverse to the width direction. Furthermore, the reheat preventing damper 43 extends across the first support portion 41 and extends from the first support portion 41 in a second direction transverse to the width direction. The second direction is a direction substantially opposite to the first direction. Thus, the first support portion 41 is sandwiched between the air mixing damper body 42 and the reheat preventing damper 43.

The first support portion 41 is a generally rod-shaped member having a circular cross section. An insertion shaft 41S is formed at the first axis A1 direction (width direction) end of the first support portion 41. The insertion shaft 41S is inserted into a shaft receiving hole H (see FIG. 4) formed at an inner wall surface 30A of the side wall portion 30 of the unit case 3. A flange portion 41B is provided on the outer circumferential side of the first flange portion 41. The flange portion 41B projects outward from the base end of the above-described insertion shaft 41S, in the radial direction with respect to the first axis A1. The flange portion 41B is provided at only a partial circumferential region with respect to the first axis A1. In other words, in the outer circumferential surface of the first support portion 41, a part at which the flange portion 41B is not provided is exposed radially outward with respect to the first axis A1.

In the present embodiment, the first support portion 41 is provided on a straight line virtually extending between the upper end part (a first end part t1) and the lower end part (a second end part t2) of the warm air outlet 84. Furthermore, as viewed in section, the first support portion 41 is provided at a position vertically corresponding to the upper end part of the heater core 2. The size from the first support portion 41 to the lower end part (a third end part t3) of the aforementioned guiding partition wall portion 10 is substantially the same as the size from the first support portion 41 to the second end part t2.

As viewed in section, the air mixing damper body 42 extends to a size from the first support portion 41 to the above-described second end part t2 (i.e., the size from the first support portion 41 to the third end part t3 of the guiding partition wall portion 10). Out of both surfaces in the thickness direction of the plate-like air mixing damper 42, a surface facing one side in the circumferential direction of the first axis A1 is a first damper plate surface 42A, and a surface facing the other side in the circumferential direction is a second damper plate surface 42B. A surface connecting the first damper plate surface 42A and the second damper plate surface 42B, i.e., a surface facing the side wall portion 30 (inner wall surface 30A) of the unit case 3, is a first damper end face 42C. The first damper end face 42C extends radially outward from one circumferential end part of the above-described flange portion 41B, and is flush with the flange portion 41B.

The reheat preventing damper 43 extends in the direction generally opposite to the air mixing damper body 42 with respect to the first support portion 41. In other words, the reheat preventing damper 43 is spaced from the air mixing damper body 42 in the circumferential direction of the first axis A1. The reheat preventing damper 43 extends in a direction deflected to the air mixing space 91 side with reference to a plane on which the air mixing damper body 42 extends. In a similar manner to the air mixing damper body 42, the reheat preventing damper 43 also has a plate-like shape extending from the first support portion 41 in the radial direction of the first axis A1. Furthermore, a surface connecting both of the circumferential surfaces of the reheat preventing damper 43, i.e., the surface facing the side wall portion 30 (inner wall surface 30A) of the unit case 3, is a second damper end face 43C. The second damper end face 43C extends radially outward from the end part on the other side in the circumferential direction of the above-described flange portion 41B and is flush with the flange portion 41B and the first damper end face 42C.

As illustrated in FIGS. 2 and 3, a plurality of ribs 44, which extend in a direction traverse to the first damper plate surface 42A, are provided on the first damper plate surface 42A of the air mixing damper body 42. In the present embodiment, three ribs 44 are arranged on the first damper plate surface 42A to be spaced apart in the direction in which the first axis A1 extends. As illustrated in FIG. 2, each rib 44 has a generally rectangular shape as viewed from the direction in which the first axis A1 extends.

As illustrated in FIG. 3, sponge seals 45 as elastic members are respectively provided at the air mixing damper body 42 and the reheat preventing damper 43, on the circumferential edge portions of their surfaces facing one circumferential side and the other circumferential side. The sponge seals 45 exhibit shock absorbing effects when the air mixing damper body 42 and the reheat preventing damper 43 contact other members and is provided for sealing to prevent leakage of fluid from a gap formed with the other members.

The air mixing damper 4 configured as described above is made rotatable between a position (a maximum cooling position Pc) indicated by a solid line in FIG. 1 and a position (a maximum heating position Ph) indicated by a dashed line in FIG. 1. At the maximum cooling position Pc, the leading end (the end part opposite the first support portion 41) of the air mixing damper body 42 is brought into contact with the second end part t2 of the warm air outlet 84 from the air mixing space 91 side. Furthermore, at the maximum cooling position Pc, the reheat preventing damper 43 is held at a position generally vertically facing the first end part t1 of the warm outlet 84 from the first support portion 41. Thus, at the maximum cooling position Pc, the cooling space 7, and the heating space 8 are partitioned by the air mixing damper body 42, and the cooling space 7 communicates with the air mixing space 91. At this time, a gap is formed in a generally vertical direction between the tips of the air mixing damper 4 and the foot switching damper 5.

On the other hand, at the maximum heating position Ph, the leading end of the air mixing damper body 42 contacts the third end part t3 of the guiding partition wall portion 10 from the air mixing space 91 side. At the maximum heating position Ph, the reheat preventing damper 43 is brought into contact with the upper end part of the heater core 2 from the return space 83 side. Thus, the cooling space 7 communicates with the heating space 8, and the heating space 8 communicates with the air mixing space 91 via the return space 83.

Figure 4:
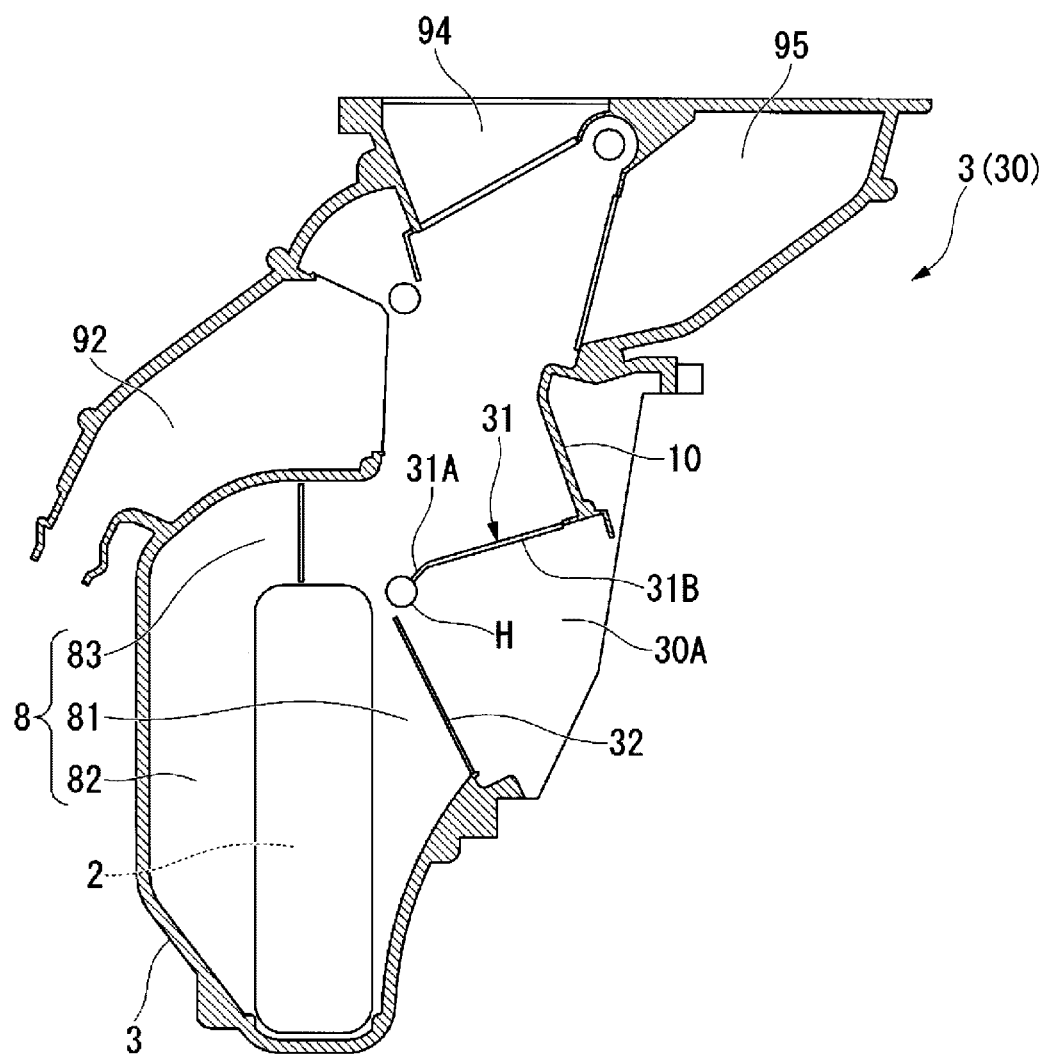
FIG. 4 is a configuration view of a unit case in an embodiment of the present invention.

As illustrated in FIG. 4, the unit case 3 includes an elongated protrusion 31 and a contact portion 32. The elongated protrusion 31 is contactable with the first damper plate surface 42A of the air mixing damper body 42 at the above-described maximum cooling position Pc, and the contact portion 32 is contactable with the second damper plate surface 42B of the air mixing damper 42 at the above-described maximum heating position Ph. The elongated protrusion 31 protrudes from the inner wall surface 30A of the unit case 3 in the first axis A1 direction. Furthermore, the elongated protrusion 31 extends in the radial direction of the first axis A1. More specifically, according to the present embodiment, the elongated protrusion 31 extends in the direction including a radial component with respect to the first axis A1. In other words, the elongated protrusion 31 may be slightly angled with respect to the radial direction of the first axis A1.

The elongated protrusion 31 includes a first portion 31A, which provides a radially outward part, and a second portion 31B, which provides a radially inward part, with respect to the first axis A1. The second portion 31B bends with a slight angle with respect to the direction in which the first portion 31A extends. In other words, as approaching radially inward from the first portion 31A, the second portion 31B further extends toward the other side in the circumferential direction.

Figure 5:
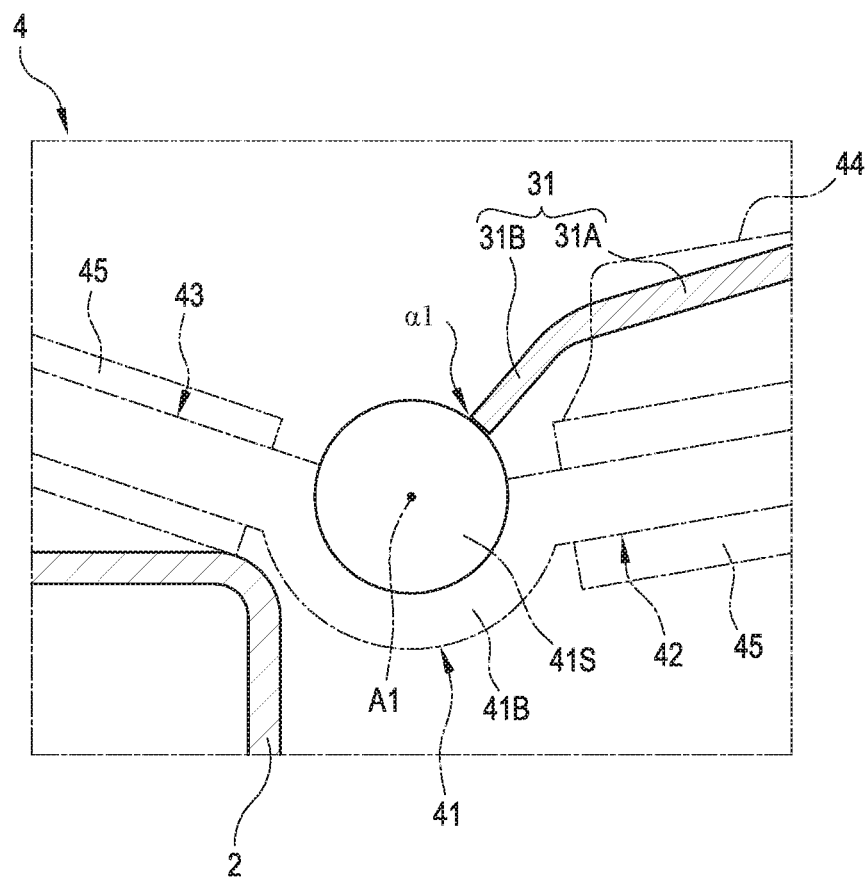
FIG. 5 is an enlarged view of the main parts of the vehicular air conditioning device in an embodiment of the present invention.

As illustrated in FIG. 5, the radially inward end part of the second portion 31B faces the outer circumferential surface (the circumferential edge of the shaft receiving hole H) of the first support portion 41 to be apart from each other by a slight radial space α1. As viewed from the radial direction with respect to the first axis A1, the dimension of the space α1 is less than the radial dimension of the flange portion 41B, similarly. In other words, the dimension of the space α1 is less than the thickness of the flange portion 41B in the radius direction.

The contact portion 32 is provided at a position spaced from the above-described elongated protrusion 31 in the circumferential direction of the first axis A1. Specifically, in a similar manner to the elongated protrusion 31, the contact portion 32 protrudes from the inner wall surface 30A of the unit case 3 in the first axis A1 direction and extends in the radial direction of the first axis A1.

When the air mixing damper 4 is located at the maximum cooling position Pc, the first damper plate surface 42A of the air mixing damper 42 is brought into contact with the above-described elongated protrusion 31 via the above-described sponge seal 45 from the other side in the circumferential direction. Meanwhile, when the air mixing damper 42 is at the maximum heating position Ph, the second damper plate surface 42B of the air mixing damper 42 is brought into contact with the above-described contact portion 32 via the above-described sponge seal 45 from one side in the circumferential direction of the first axis A1. In other words, the elongated protrusion 31 and the contact portion 32 define a pivot angle range θ1 of the first support portion 41. The angular range of the region in the first support portion 41 at which the flange portion 41B is not formed (the angular range around the first axis A1) corresponds to the pivot angle range θ1 of the above-described first support portion 41. Therefore, when the first support portion 41 rotates, the flange portion 41B and the elongated protrusion 31 do not interfere with the contact portion 32.

In the air mixing space 91, at a region (i.e., above the heating space 8) generally facing the above-described guiding partition wall portion 10 in the traveling direction, the foot outlet flow channel 92 is defined by the inner wall of the unit case 3. The foot outlet flow channel 92 is in communication with a foot outlet port (not illustrated) for feeding the air to passenger's feet in the vehicle.

The end part of the foot outlet channel 92 (the end part closer to the air mixing space 91) is a foot inlet E1 for introducing the air from the air mixing space 91. The foot inlet E1 is an opening which extends in a generally vertical direction as viewed in section. The upper end part of the foot inlet E1 is a fifth end part t5, and the lower end part of the foot inlet E1 is a sixth end part t6.

The foot switching damper 5 is disposed at the foot inlet E1. The foot switching damper 5 includes a plate-like member that is pivotably supported on the foot inlet E1. The foot switching damper 5 includes a second support portion 51, which pivots on a second axis A2 extending in the vehicle width direction, and a foot switching damper body 52, which is provided at the second support portion 51. The foot switching damper 52 extends along the second support portion 51, from the second support portion 51 in the direction transverse to the width direction. The foot switching damper body 52 extends from the second end portion 51, by the size from the fifth end part t5 to the sixth end part t6 of the foot inlet E1. Furthermore, the foot switching damper body 52 extends from the second support portion 51, by the size from the second support portion 51 to the upper end part (the fourth end part t4) of the above-described end part of the guiding partition wall portion 10. In other words, the size from the second support portion 51 (the second axis A2) to the fourth end part t4 is substantially equal to the size from the second support portion 51 to the sixth end part t6.

The foot switching damper 5 configured as described above is made rotatable between a position indicated by a solid line in FIG. 1 (a closing position Ps) and a position indicated by a dashed line (a communicating position Pt) in FIG. 1. At the closing position Ps, both of the end parts of the foot switching damper body 52 are respectively brought into contact with the fifth end part t5 and the sixth end part t6 of the foot outlet flow channel 92. Accordingly, at the closing position Ps, the air mixing space 91 and the foot outlet flow channel 92 are partitioned by the foot switching damper body 52, and the air mixing space 91 communicates with the foot outlet flow channel 92.

On the other hand, at the communicating position Pt, the end part of the foot switching damper body 52 is brought into contact with the fourth end part t4 of the guiding partition wall portion 10 from the air mixing space 91 side. Hence, the air mixing space 91 and the intermediary space 93 to be described later are partitioned, and the air mixing space 91 communicates with the foot outlet flow channel 92.

Another space is formed above the air mixing space 91. Such another space is the intermediary space 93. The intermediary space 93 serves as a space for distributing the air supplied from the air mixing space 91 to the defroster outlet flow channel 95 and the face outlet flow channel 94, as will be described later.

At the region generally facing the foot inlet E1 in the traveling direction (i.e., the region positioned above the cooling space 7 and communicating with the intermediary space 93), the defroster outlet flow channel 95 is defined by the inner wall of the unit case 3. The defroster outlet flow channel 95 communicates with a defroster outlet (not illustrated) for feeding defrosting air toward a windshield (a front window) from the inside of the vehicle.

The end part of the defroster outlet flow channel 95 (the end part on the intermediary space 93 side) is a defroster inlet E2 for introducing the air from the intermediary space 93. The defroster inlet E2 is an opening extending in a generally vertical direction as viewed in section. The upper end part of the defroster inlet E2 is a seventh end part t7, and the lower end part of the defroster inlet E2 is an eighth end part t8.

The face/defroster switching damper 6 is disposed at the defroster inlet E2. The face/defroster switching damper 6 has a plate-like member pivotably supported over the defroster inlet E2. More specifically, the face/defroster switching damper 6 includes a third support portion 61, which rotates about a third axis A3 extending in the vehicle width direction, and a face/defroster switching damper body 62 provided at the third support portion 61. The face/defroster switching damper body 62 extends along the third support portion 61 from the third support portion 61 in a direction transverse to the width direction. The face/defroster switching damper body 62 extends from the third support portion 61, by the size from the seventh end part t7 to the eighth end part t8 of the defroster inlet E2. Furthermore, the face/defroster switching damper body 62 extends from the third support portion 61, by the size from the third support portion 61 to the fifth end part t5 of the foot inlet E1. In other words, the size from the third support portion 61 (the third axis A3) to the fifth end part t5 is substantially the same as the size from the third support portion 61 to the eighth end part t8.

Yet another space is provided above the intermediary space 93. Such another space is a face outlet flow channel 94. The face outlet flow channel 94 serves as a channel for taking in the air from the intermediary space 93 and feeding the air to a face outlet (not illustrated) disposed within the interior space of the vehicle. The face outlet is provided mainly for feeding cool air or warm air to the upper body of a passenger.

The face/defroster switching damper 6 is made rotatable between a face position Pf indicated by a solid line in FIG. 1 and a defroster position Pd indicated by a dashed line in FIG. 1. At the face position Pf, the leading end of the face/defroster switching damper body 62 is brought into contact with the eighth end part t8 of the defroster inlet E2 from the intermediary space 93 side. Thus, the defroster outlet flow channel 95 and the intermediary space 93 are partitioned, and the intermediary space 93 communicates with the face outlet flow channel 94.

On the other hand, at the defroster position Pd, the leading end of the face/defroster switching damper body 62 is brought into contact with the fifth end part t5 of the foot inlet E1 from the intermediary space 93 side. Thus, the defroster outlet flow channel 95 communicates with the intermediary space 93, and the intermediary space 93 and the face outlet flow channel 94 are partitioned.

With the configuration described above, by rotating the air mixing damper 4, the foot switching damper 5, and the face/defroster switching damper 6 respectively, the ratio of mixing the cool air from the cooling space 7 and the warm air from the heating space 8 are adjusted, and in addition, the distribution state of air to the channels (the foot outlet flow channel 92, the defroster outlet flow channel 95, and the face outlet flow channel 94) are switched.

First, a case in which the vehicular air conditioning device 100 is used for a cooling operation (at the maximum cooling operation) will be described. At the maximum cooling operation, the air mixing damper 4 is maintained at the above-described maximum cooling position Pc indicated by the solid line in FIG. 1. More specifically, the leading end of the air mixing damper body 42 is maintained in contact with the second end part t2 of the warm air outlet 84, and the leading end of the reheat preventing damper 43 is maintained vertically facing the first end part t1 of the warm air outlet 84.

Thus, the cooling space 7 and the heating space 8 are partitioned by the air mixing damper 4, and the air cooling space 7 communicates with the air mixing space 91. In such a state, the air is sent into the cooling space 7 from the fan, not illustrated. The air introduced in the cooling space 7 is brought into contact with the evaporator 1 from the introducing space 71 side, thus the heat of the air is absorbed, and the air becomes cool air. The cool air flows into the air mixing space 91, which communicates with the cooling space 7 (the cool air supply space 72), by blowing of the fan. Furthermore, after flowing upward from the air mixing space 91, the cool air is guided to any one of the face outlet flow channel 94, the defroster outlet flow channel 95, and the foot outlet flow channel 92, depending on the positions of the foot switching damper 5 and the face/defroster switching damper 6.

Specifically, when the foot switching damper 5 is located at the closing position Ps indicated by the solid line in FIG. 1, the air mixing space 91 is partitioned from the foot outlet flow channel 92 by the foot switching damper body 52, and the air mixing space 91 communicates with the foot outlet flow channel 92. Accordingly, the cool air supplied from the cooling space 7 flows toward the intermediary space 93 without flowing into the foot outlet flow channel 92. The air having flowed to the intermediary space 93 then flows into one of the face outlet flow channel 94 and the defroster outlet flow channel 95, depending on the position of the face/defroster switching damper 6 (the face position Pf or the defroster position Pd).

When the foot switching damper 5 is at the closing position Ps and the face/defroster switching damper 6 is at the face position Pf, the air flowing through the intermediary space 93 flows toward the face outlet flow channel 94. In contrast, when the face/defroster switching damper 6 is at the defroster position Pd, the air flowing through the intermediary space 93 flows toward the defroster outlet flow channel 95.

Subsequently, a case in which the vehicular air conditioning device 100 is used for a heating operation (at the maximum heating operation) will be described. At the maximum heating operation, the air mixing damper 4 is held at the above-described maximum heating position Ph as indicated by the dashed line in FIG. 1. More specifically, the leading end of the air mixing damper body 42 contact the third end part t3 of the guiding partition wall portion 10 from the air mixing space 91 side. At the same time, the reheat preventing damper 43 contacts the upper end part of the heater core 2 from the return space 83 side.

Thus, the cooling space 7 communicates with the heating space 8, and in addition, the heating space 8 communicates with the air mixing space 91 via the return space 83. In such a state, the air is sent into the cooling space 7 from the fan, not illustrated. The air is introduced into the cooling space 7, and flows into the heating space 8, which is connected to the cooling space 7, from the second introducing space 81 side, by blowing of the fan. The air is brought into contact with the heater core 2 in the heating space 8 and becomes warm air. Furthermore, such warm air flows upward along the heating space 8 (the warm air supply space 82), and then flows into the air mixing space 91, which is in communication with the return space 83, via the return space 83.

The warm air flows into the air mixing space 91 and flows upward. Then, as described above, the warm air flows toward any one of the face outlet flow channel 94, the defroster outlet flow channel 95, and the foot outlet flow channel 92, depending on the positions of the foot switching damper 5 and the face/defroster switching damper 6.

The air mixing damper 4 is freely rotatable between the above-described maximum cooling position Pc and the above-described maximum heating position Ph as described above. In other words, a mixing ratio between the cool air and the warm air is appropriately adjusted by holding the air mixing damper partway between the maximum cooling position Pc and the maximum heating position Ph. More particularly, when the air mixing damper 4 is held at a position closer to the maximum cooling position Pc, it is possible to supply air with a relatively low temperature to the inside of the vehicle. On the other hand, when the air mixing damper 4 is held at a position closer to the maximum heating position Ph, it is possible to supply air with a relatively high temperature to the inside of the vehicle.

During the maximum heating operation described above, it is necessary to suppress inadvertent interchange of a fluid between the heater core 2 and the evaporator 1 in order to improve the thermal efficiency (to improve the heating efficiency) and to ensure uniformity of a temperature distribution inside the vehicle. Thus, it is necessary to reduce the possibility that some amount of the heat quantity from the heater core 2 is reduced by the air cooled by the evaporator 1 (cool air). In particular, around the first support portion 41 of the above-described air mixing damper 4, the movable range of the first support portion 41 and suppression of fluid leakage are both demanded.

Hence, in the vehicular air conditioning device 100 according to the present invention, the fluid flow (leakage) around the first support portion 41 is blocked by the second portion 31B of the above-described elongated protrusion 31. Specifically, the radially inward end part of the elongated protrusion 31 (the second portion 31B) faces the outer circumferential surface (the circumferential edge of the shaft receiving hole H) of the first support portion 41 across a slight radial space $\alpha 1$. As viewed from the radial direction of the first axis A1, the dimension of the space $\alpha 1$ is less than the radial size of the flange portion 41B, similarly (see FIG. 5).

According to such a configuration, the radial space between the radially inward end part of the elongated protrusion 31 and the shaft receiving hole H is less than the radial size of the flange portion 41B. As a result, it is possible to reduce the possibility of fluid leakage from the gap between the radially inward end part of the elongated protrusion 31 and the rotating shaft portion. In contrast, when the radial space between the radially inward end part of the elongated protrusion 31 and the shaft receiving hole H is greater than the radial dimension of the flange portion 41B, the above-described space increases with an axial misalignment of the rotating shaft portion. As a result, there is a possibility of fluid leakage through the gap. However, according to the configuration above, such a possibility can be reduced.

Since the fluid (air) leakage around the first support portion 41 can be reduced, a temperature distribution of the air in the first axial direction A1 can be uniform. When air leakage occurs on both sides of the air mixing damper 4 in the first axis A1 direction, mixing of the cool air from the cooling space 7 may lower the temperature of the air supplied from the air outlet ports positioned at the both sides in the vehicle width direction than the temperature of the air from another air outlet port (a port at the center in the width direction). That is, an unbalance in temperature distribution of the air may occur in the vehicle width direction (in the first axis A1 direction).

However, according to the present embodiment, the air leakage from the both sides of the first support portion 41 in the width direction is suppressed by the elongated protrusion 31 (the second portion 31B) provided at the inner wall surface 30A of the unit case 3 positioned on both sides in the width direction. This achieves uniformity of the temperature distribution of the air. Specifically, the efficiency of the vehicular air conditioning device 100 is sufficiently enhanced.

In particular, according to the present embodiment, the second portion 31B of the elongated protrusion 31 is angled (bent) in the circumferential direction of the first axis A1 with respect to the first portion 31A. According to such a configuration, irrespective of the direction in which the first portion 31A extends, the second portion 31B is made to extend in the radial direction of the shaft receiving hole H (the first axis A1). In other words, the air leakage is suppressed as described above, while reducing the radial size of the second portion 31B as much as possible. On the other hand, when the radial size of the second portion 31B is greater than the above-described size, the second portion 31B may interfere with another member as the first support portion 41 rotates. Thus, the range of rotation angle of the first support portion 41 may be restricted. However, according to the present embodiment, since minimization is achieved by bending the second portion 31B with respect to the first portion 31A, the possibility of such interference can be reduced.

Furthermore, according to the above-described configuration, the reheat preventing damper 43 as the second damper body is provided, and thus a larger size of the entire damper can be ensured. Accordingly, when the flow of the fluid flowing through the unit case 3 is changed or guided, even in a case where the cross-sectional area of the flow path of the fluid is large, the configuration is sufficiently versatile.

In addition, according to the above-described configuration, the angular range of the region at which the flange portion 41B is not formed corresponds to the range of pivot angle of the rotating shaft portion. This prevents the flange portion 41B and the elongated protrusion 31 from interfering with the contact portion 32, when the first support portion 41 as the rotating shaft portion rotates. In other words, according to the above-described configuration, the fluid leakage around the first support portion 41 is suppressed, and a sufficiently wide range of pivot angle of the first support portion 41 is ensured.

Embodiments of the present invention have been described with reference to the drawings. Various changes and modifications can be made without departing from the scope of the present invention.

For example, in the above-described embodiments, descriptions have been given on an example in which the second portion 31B of the elongated protrusion 31 extends toward the other side in the circumferential direction as it approaches radially inward side from the radially outward side of the first axis A1. However, embodiments of the second portion 31B are not limited to such an example. Conversely, the second portion 31B of the elongated protrusion 31 may extend toward one side in the circumferential direction as it approaches radially outward side from the radially inward side of the first axis A1.

In the above-described embodiments, the vehicular air conditioning device 100 is arranged in the vehicle width direction. However, the arranged direction and attitude of the vehicular air conditioning device 100 are not limited by the above-described embodiments, and may be appropriately changed depending on a design and a specification.

For the embodiments above, the descriptions have been given on the configuration in which the channels in communication with the air mixing space 91 include the face outlet flow channel 94, the defroster outlet flow channel 95, and the foot outlet flow channel 92. However, he channels are not limited to the examples described above. For example, in addition to the respective channels described above, another channel for feeding air toward a rear seat or the like of the vehicle may be provided.

Further, the above-described channels, directions and sizes that the respective dampers extend, or the relative positional relationships between the respective parts are not limited by the above-described embodiments, and may be appropriately changed depending on a design and a specification.

INDUSTRIAL APPLICABILITY

According to one aspect of the present invention, sufficient air conditioning efficiency is exhibited.

REFERENCE NUMERALS

1 Evaporator
2 Heater core
3 Unit case
4 Air mixing damper
5 Foot switching damper
6 Face/defroster switching damper
7 Cooling space
8 Heating space
10 Guiding partition wall portion
30 Side wall portion
30A Inner wall surface
31 Elongated protrusion
32 Contact portion
31A First portion
31B Second portion
41 First support portion
41B Flange portion
41S Insert axis
42 Air mixing damper body
42A First damper plate surface
42B Second damper plate surface
42C First damper end face
43 Reheat preventing damper
43C Second damper end face
44 Rib
45 Sponge seal
51 Second support portion
52 Foot switching damper body
61 Third support portion
62 Face/defroster switching damper body
71 Introduction space
72 Cool air supply space
73 Cool air outlet
81 Second introduction space
82 Warm air supply space
83 Return space
84 Warm air outlet
91 Air mixing space
92 Foot outlet flow channel
93 Intermediary space
94 Face outlet flow channel
95 Defroster outlet flow channel
100 Vehicular air conditioning device
A1 First axis
A2 Second axis
A3 Third axis
E1 Foot inlet
E2 Defroster inlet
H Shaft receiving hole
Pc Maximum cooling position
Pd Defroster position
Pf Face position
Ph Maximum heating position Ps Closing position
Pt Communicating position
t1 First end part
t2 Second end part
t3 Third end part
t4 Fourth end part
t5 Fifth end part
t6 Sixth end part
t7 Seventh end part
t8 Eighth end part

The invention claimed is:

1. A vehicular air conditioning device comprising:
a damper including a rotating shaft portion and a first damper body, the rotating shaft extending in an axial direction with an insertion shaft arranged at an end in the axial direction, the first damper body extending from the rotating shaft portion in a radial direction of the axis and having a plate-like shape; and
a unit case including a side wall portion with a shaft receiving hole into which the insertion shaft is rotatably inserted, and configured to accommodate the damper, wherein
the rotating shaft portion includes a flange portion provided at only a part of a circumferential region of the axis, the flange portion extending radially outward from a base end of the insertion shaft,
the first damper body includes a first damper plate surface facing one side in a circumferential direction, a second damper plate surface facing another side in the circumferential direction, and a first damper end face extending radially outward from an end surface of the flange portion in the axial direction of the flange portion,
the first damper end face and the end surface of the flange portion are in a same plane,
the side wall portion includes an inner wall surface, an elongated protrusion, and a contact portion, the inner wall surface formed to face the first damper end face and the end surface of the flange portion when the rotating shaft is inserted into the shaft receiving hole, the elongated protrusion protruding in the axial direction from the inner wall surface and extending in the radial direction of the axis, the contact portion being provided to be apart from the elongated protrusion in the circumferential direction, protruding in the axial direction from the inner wall surface and extending in the radial direction of the axis,
the rotating shaft and the flange portion are rotatable around the axial direction between a first position and a second position,
the first damper plate surface of the first damper body comes in contact with the elongated protrusion when the rotating shaft and the flange portion rotate to the first position,
the second damper plate surface of the first damper body comes in contact with the contact portion when the rotating shaft and the flange portion rotate to the second position,
a radial space between a radially inward end part of the elongated protrusion and the shaft receiving hole is less than a radial size of the flange portion, and
an angular range of a region in the rotating shaft at which the flange portion is not formed is equal to a pivotable angle range of the rotating shaft which is defined by the elongated protrusion and the contact portion.

2. The vehicular air conditioning device according to claim 1, wherein
the damper further includes a second damper body being spaced from the first damper body in the circumferential direction, and having a plate-like shape extending from the rotating shaft portion in the radial direction of the axis,
the second damper body includes a second damper end face extending radially outward from the end surface of the flange portion,
the second damper end face, the first damper end face, and the end surface of the flange portion are in the same plane.

3. The vehicular air conditioning device according to claim 1, wherein
the elongated protrusion includes:
a first portion constituting a radially outward part of the elongated protrusion; and
a second portion constituting a radially inward part of the elongated protrusion,
the elongated protrusion is bent at a connection between the first portion and the second portion such that an angle is formed between the first portion and the second portion, and the second portion is directed toward the axial direction of the rotating shaft portion with respect to the first portion.

4. The vehicular air conditioning device according to claim 1, wherein
an angular range of a region, in which the flange portion is not provided, around the axis at the rotating shall portion corresponds to a pivot angle range of the rotating shaft portion to be defined by the elongated protrusion and the contact portion, the elongated protrusion being configured to contact the first damper body.

5. The vehicular air conditioning device according to claim 1, further comprising:
an evaporator configured to cool air; and
a heater core configured to heat air,
wherein a cooling space, a heating space, and an air mixing space are formed in the unit case, the cooling space being configured to accommodate the evaporator, a heating space being connected to the cooling space and configured to accommodate the heater core, the mixing space being connected to the cooling space and the heating space, and
the damper serves as an air mixing damper provided among the cooling space, the heating space, and the mixing space, in the unit case, the air mixing damper being configured to rotate between a maximum cooling position and a maximum heating position to adjust a ratio of air to be introduced into the air mixing space between the air from the cooling space and the air from the heating space.

* * * * *